(12) United States Patent
Iwama (10) Patent No.: US 6,778,359 B1
(45) Date of Patent: Aug. 17, 2004

(54) THIN FILM MAGNETIC HEAD FOR MAGNETIC TAPE DRIVE

(75) Inventor: Hideo Iwama, Tokyo (JP)

(73) Assignee: NEC Corporation (JP)

( * ) Notice: Subject to any disclaimer, the term of this patent is extended or adjusted under 35 U.S.C. 154(b) by 15 days.

(21) Appl. No.: 09/669,112

(22) Filed: Sep. 25, 2000

(30) Foreign Application Priority Data

Sep. 28, 1999 (JP) .......................................... 11-274125

(51) Int. Cl.$^7$ .............................................. G11B 5/48
(52) U.S. Cl. ..................................................... 360/129
(58) Field of Search ................................ 360/129, 126, 360/121, 125, 317, 318, 119, 130.21, 130.24, 271.5, 281.5, 21

(56) References Cited

U.S. PATENT DOCUMENTS

| | | | | |
|---|---|---|---|---|
| 4,268,882 A | * | 5/1981 | Fukuda ........................ 360/118 |
| 4,683,509 A | * | 7/1987 | Steele ......................... 360/119 |
| 4,809,110 A | * | 2/1989 | Hertrich ...................... 360/122 |
| 4,926,278 A | * | 5/1990 | Schoenmakers ............. 360/129 |
| 4,945,438 A | * | 7/1990 | Matsumoto et al. ......... 360/121 |
| 5,257,148 A | * | 10/1993 | Solhjell et al. ........... 360/77.06 |
| 5,289,328 A | * | 2/1994 | Saliba ......................... 360/121 |
| 5,307,217 A | * | 4/1994 | Saliba .......................... 360/76 |
| 5,311,386 A | * | 5/1994 | Mallary ....................... 360/123 |
| 5,365,392 A | * | 11/1994 | Sato et al. ................... 360/126 |
| 5,423,116 A | * | 6/1995 | Sundaram ................... 29/603.1 |
| 5,471,355 A | * | 11/1995 | Ogata et al. .................. 360/84 |
| 5,543,990 A | * | 8/1996 | Mizoh et al. ................ 360/122 |
| 5,592,351 A | * | 1/1997 | Carter ......................... 360/106 |
| 5,715,122 A | * | 2/1998 | Ohmori et al. ............. 360/119 |
| 5,729,890 A | * | 3/1998 | Rottenburg et al. ...... 29/603.06 |
| 5,831,798 A | * | 11/1998 | Muller et al. ............... 360/121 |
| 5,883,770 A | * | 3/1999 | Biskeborn et al. ...... 360/130.21 |
| 5,936,815 A | * | 8/1999 | Kumagai et al. ........... 360/126 |
| 5,953,184 A | * | 9/1999 | Barber et al. ............... 360/121 |
| 5,978,188 A | * | 11/1999 | Kaaden et al. ......... 360/130.32 |

FOREIGN PATENT DOCUMENTS

| | | |
|---|---|---|
| JP | 1-303617 | 12/1989 |
| JP | 61-061215 | 3/2003 |

* cited by examiner

*Primary Examiner*—Robert S. Tupper
(74) *Attorney, Agent, or Firm*—Hayes Soloway P.C.

(57) ABSTRACT

A thin film magnetic head for a magnetic tape drive to correctly read out, even if off-track, the high density magnetic patterns recorded on magnetic tape without picking up noise from adjacent tracks. A thin film magnetic head is comprised of a first composite thin film magnetic head having a read element and write element with complementary parallel read gaps and write gaps to read and write information on a first track of a magnetic tape, and a second composite thin film magnetic head having a read element and write element with a complementary parallel read gap and a write gap to read and write information on a second track adjacent to a first track, and the read gap and the write gap of the first magnetic head form a right angle relative to the drive direction of the magnetic tape, and the read gap and the write gap of the second magnetic head form an oblique (θ) angle relative to the drive direction of the magnetic tape.

14 Claims, 6 Drawing Sheets

THIN FILM MAGNETIC HEAD FOR MAGNETIC TAPE DRIVE

BACKGROUND OF THE INVENTION

The present invention relates to a magnetic tape drive installed with a magnetic head to apply a magnetic field to a magnetic tape by making contact with the moving magnetic tape.

DESCRIPTION OF THE RELATED ART

Figure 7:
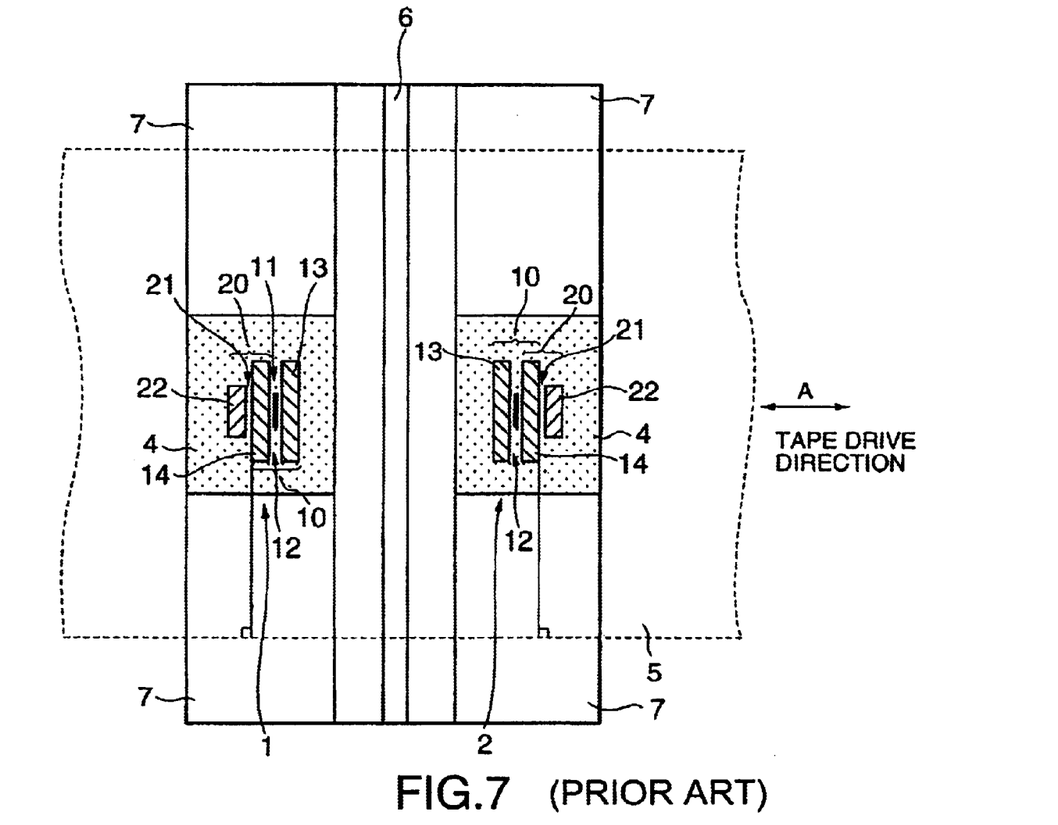
FIG. 7 is a plan view showing the structure of the magnetic head of the related art.

An example of a thin film magnetic head for a magnetic tape drive of the related art is shown in FIG. 7 viewed from the side rubbed by the magnetic tape. FIG. 7 shows that the thin film magnetic head for a magnetic tape drive of the related art has a composite thin film magnetic head 1 comprised of a read element 10 enclosed by an insulator layer 4 and a write element 20 installed approximately in parallel with a read element 10, and further has a composite thin film magnetic head 2 having the same structure as the composite thin film magnetic head 1 and arrayed in the symmetrical reverse of the composite thin film magnetic head 1.

A shield member 6 is sometimes installed between the composite thin film magnetic head 1 and the composite thin film magnetic head 2 to prevent mutual interference during the write or the read operations of the composite thin film magnetic head 1 and composite thin film magnetic head 2. Here, the read gap 11 of the read element of the composite thin film magnetic head 1 and composite thin film magnetic head 2 and the longitudinal write gap 21 of the write element, form a right angle relative to the drive direction A of the magnetic tape.

Figure 8:
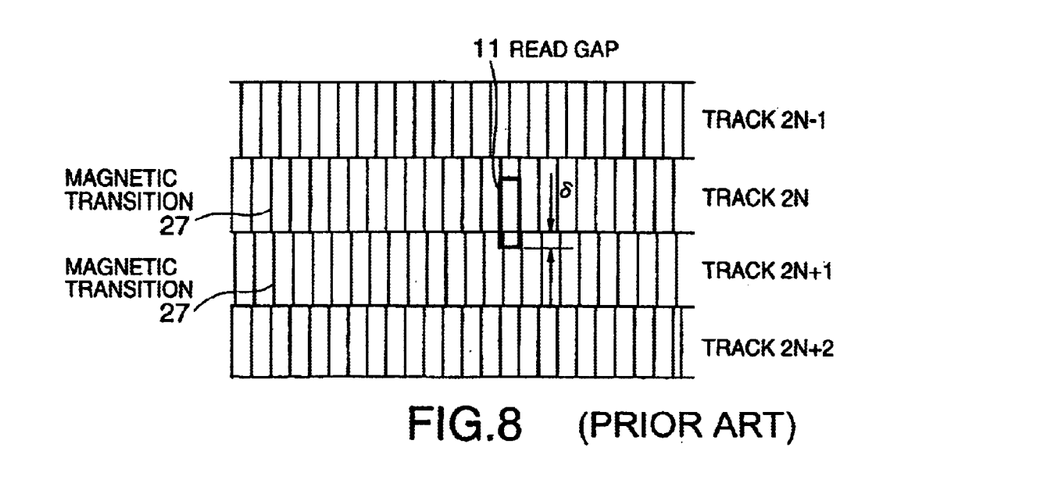
FIG. 8 is a drawing showing the positional relation of the track and the read gap written in the magnetic head of the related art.

A typical high density magnetic pattern written by utilizing the structure for a thin film magnetic head for a magnetic tape drive is shown in FIG. 8. The track $2n-1$ and the track $2n+1$ are written from right to left by the composite thin film magnetic head 2. The track $2n$ and the track $2n+2$ are written from left to right by the composite thin film magnetic head 1.

The composite thin film magnetic head 1 and composite thin film magnetic head 2 are installed on an actuator driven by a step motor and a voice coil motor. The composite thin film magnetic head 1 must be positioned directly over the track $2n$ by actuator drive when the composite thin film magnetic head 1 is reading the magnetic pattern of the track $2n$. However, the accuracy of the mechanical positioning is deficient due to variations in part dimensions during manufacture such as in the actuator drive shaft and the step motor. There is therefore a certain probability that an offset (or deviation) of the composite thin film magnetic head 1 from the track $2n$ by an amount equal to angle $\delta$ will occur.

In the structure of the related art, the longitudinal read gap 11 of the composite thin film magnetic head 1 is largely parallel (approximately parallel to the track width) to the longitudinal magnetic transition 27 of the magnetic pattern of the track $2n+1$, so that no azimuth loss will occur during read-out of the magnetic pattern of track $2n+1$, and the read output obtained from the track $2n+1$ magnetic pattern will be noise on the read output of track $2n$, and overlap onto the read output of track $2n$. As a result, the read output detector circuit of the magnetic tape drive will mistakenly detect the noise caused by the track $2n+1$ magnetic pattern, as the signal obtained from the track $2n$ magnetic pattern, thus causing the problem that the magnetic pattern correctly written on track $2n$ cannot be read-out.

A method was contrived to sufficiently narrow the width of the track for the magnetic conversion element so that the read gap will not interfere with the track $2n+1$ even if for instance, the positioning of the composite thin film magnetic head 2 has a $\delta$ offset. This method is at least effective and is widely utilized.

The read output of this technology of the related art however, is proportional to the track width of the magnetic conversion element, thus creating the new problem that the more the track width of the magnetic conversion element is narrowed, the lower the read output becomes. The greater the write density in particular becomes, the narrower the track width so that there is a limit on how much the track width of the magnetic conversion element can be narrowed and still maintain the signal-to-noise (S/N) ratio of the read signal and this problem becomes more obvious as the write density increases.

SUMMARY OF THE INVENTION

In view of the above problems with the related art, this invention has the main object of providing a thin film magnetic head for a magnetic tape drive to correctly read out, even if off-track, the high density magnetic patterns written on the magnetic tape without picking up noise from adjacent tracks, even if a phenomenon occurs such as a magnetic head not positioned at the correct position (off-track condition) caused by a TMR (track miss registration) involving the mechanical positioning precision.

To achieve the above objectives, an example of the related art had a thin film magnetic head for a magnetic tape drives consisting of two composite thin film magnetic heads each having an azimuth angle. However when using this head to read-out a magnetic pattern (FIG. 8) written with the head of the related art shown in FIG. 7, even if the mechanical positioning was precise, an azimuth loss occurred even if the position of the magnetic head $1a$ was not offset versus the specified track, thus causing the problem that the magnetic pattern of the specified track could not be read out with a high signal-to-noise (SN) ratio.

This invention therefore has another main objective of providing a thin film magnetic head for a magnetic tape drive to correctly read out high density magnetic patterns written on magnetic tape, with no deterioration in the read signal-to-noise (SN) ratio, even if the magnetic pattern (FIG. 8) was written with a head of the related art as shown in FIG. 7.

To achieve the above objects, a thin film magnetic head for a magnetic tape drive of this invention, utilized in magnetic tape drives to read and write computer data comprises:

a first composite thin film magnetic head to read and write information on a first track of a magnetic tape, along with a read element and write element with a mutual parallel read gap and a write gap, and a second composite thin film magnetic head to read and write information on a second track adjacent to a first track and having a read element and write element, with a mutual parallel read gap and a write gap, and the read gap and the write gap of the first composite thin film magnetic head form a right angle versus the drive direction of the magnetic tape, and the read gap and the write gap of the second composite thin film magnetic head form an oblique ($\theta$) angle versus the drive direction of the magnetic tape.

The thin film magnetic head for a magnetic tape drive of this invention preferably satisfies the relation of an angle theta ($\theta$) greater than 70° and less than 90°.

A thin film magnetic head for a magnetic tape drive of this invention, has the first and second composite thin film magnetic heads arrayed in a row in the tape drive direction.

A thin film magnetic head for a magnetic tape drive of this invention, has first and second composite thin film magnetic heads in a row, with respectively a read element installed on the inner side and a write element installed on the outer side respectively in the tape drive direction.

Another thin film magnetic head for a magnetic tape drive of this invention, has first and second composite thin film magnetic heads in a row, with respectively a read element installed on the outer side and a write element installed on inner side respectively in the tape drive direction.

Another thin film magnetic head for a magnetic tape drive of this invention, has the first and second composite thin film magnetic heads installed in a row intersecting the tape drive direction.

Another thin film magnetic head for a magnetic tape drive of this invention, further comprising: a third composite thin film magnetic head to read and write information on the first track, along with a read element and a write element having a read gap and a write gap in parallel with a read gap and a write gap of the first composite thin film magnetic head; and a fourth composite thin film magnetic head to read and write information on the second track, along with a read element and a write element having a read gap and a write gap in parallel with the read gap and a write gap of the second composite thin film magnetic head.

Another thin film magnetic head for a magnetic tape drive of this invention, has the first and third composite thin film magnetic heads are installed in a row in the tape drive direction, the second and fourth composite thin film magnetic heads are installed in a row in the tape drive direction, and the first and second composite thin film magnetic heads are installed in a row intersecting the tape drive direction, and the third and fourth composite thin film magnetic heads are installed in a row intersecting the tape drive direction.

A characteristic feature of the thin film magnetic head for a magnetic tape drive of this invention, comprising at least two composite thin film magnetic heads is that an azimuth angle is provided in the read gap and write gap of at least one of the composite thin film magnetic heads, and by installing the other composite thin film magnetic heads with read gaps and write gaps at right angles to the drive direction of the magnetic tape, read-out compatibility can be maintained with other equipment of the related art, and the read out performance can be improved when off-track.

Figure 1:
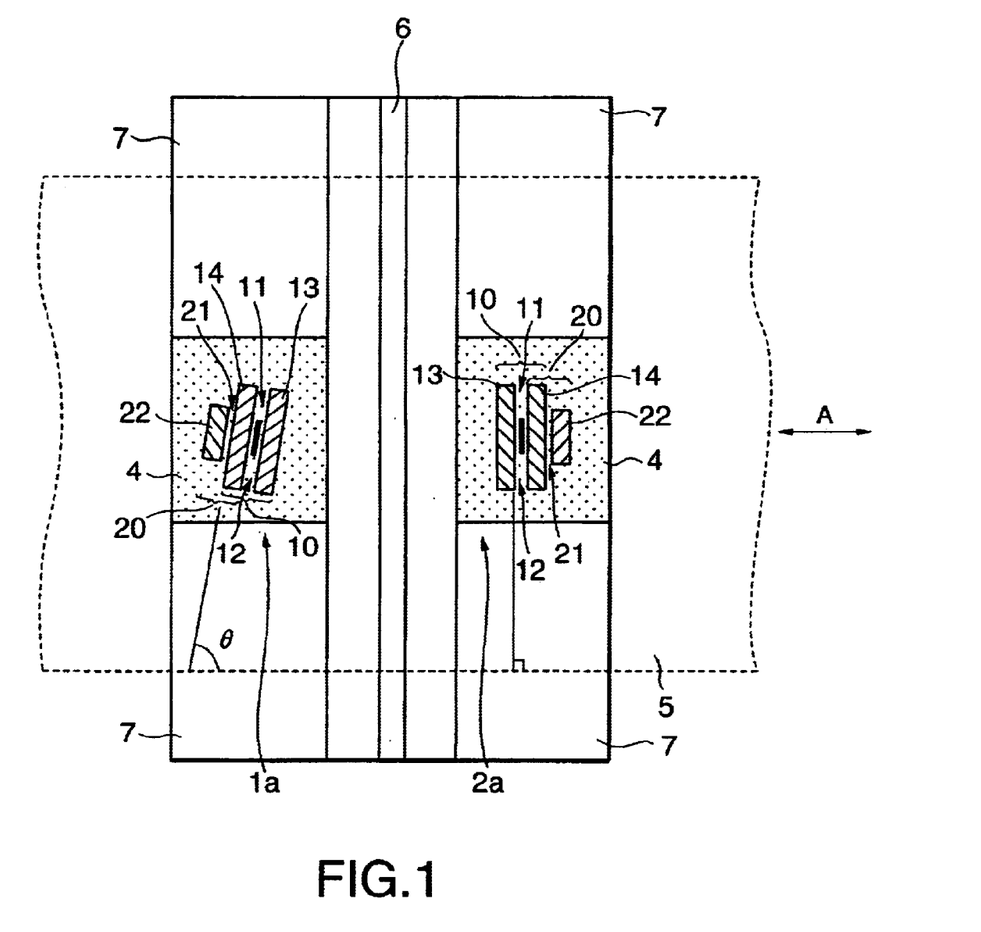
FIG. 1 is a plan view showing the structure of the first embodiment of the magnetic head of this invention.
Figure 2:
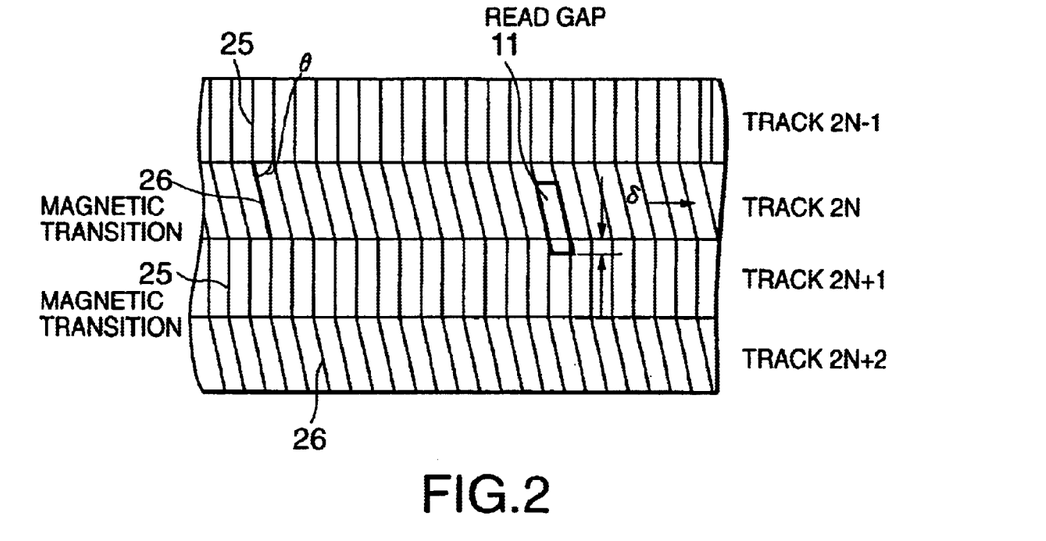
FIG. 2 is a drawing showing the positional relation of the track and the read gap written in the magnetic head of this invention.

As shown in FIG. 2 of the thin film magnetic head for a magnetic tape drive of this invention in FIG. 1, an angle theta θ is provided in the longitudinal read gap and the longitudinal write gap (hereafter simply read gap and write gap) of the composite thin film magnetic head la relative to the drive direction A of the magnetic tape and further, an angle of 90° is provided in the longitudinal read gap and the longitudinal write gap of the composite thin film magnetic head 2a relative to the drive direction of the magnetic tape. Therefore, the magnetic transition of the even tracks and the magnetic transition of the odd tracks form a relative angle (90°–θ) on the magnetic pattern written on the magnetic tape with this head. So even if the head is not accurately positioned on the specified track, and the position is offset in the direction of the adjacent track (direction of tape width), the head fulfills its role and due to the effect of azimuth loss, reads out only the magnetic pattern of the specified track. Therefore, the read operation can be performed correctly, even if the accuracy of the mechanical position is poor, or the head is offset to a position in the direction of the adjacent track. Magnetic patterns written with a head of the related technology can also be accurately read out by utilizing the head 2a.

BRIEF DESCRIPTION OF THE DRAWINGS

The novel features believed characteristic of the invention are set forth in the appended claims. The invention itself however, as well as other features and advantages thereof, will be best understood by reference to the detailed description which follows, while referring to the accompanying drawings, wherein:

DESCRIPTION OF THE PREFERRED EMBODIMENTS

FIG. 1 is a drawing of the embodiment thin film magnetic head for a magnetic tape drive of this invention as seen from the side where contact is made with the magnetic tape. As shown in FIG. 1, the thin film magnetic head for a magnetic tape drive of this invention is comprised of a composite thin film magnetic head 1a (hereafter, "magnetic head 1a") and a composite thin film magnetic head 2a (hereafter, "magnetic head 2a") connected with the magnetic head 1a by means of a shield member 6. The magnetic head 1a and 2a are in a line parallel to the tape drive direction (direction of arrow A) of the magnetic tape 5 and the magnetic head 1a is adjacent to the magnetic head 2a.

The magnetic head 1a has a write element 20 installed adjacent and roughly parallel to a read element 10 and along with this read element 10 is installed at a specified position within the insulator layer 4 so as to be enclosed by the insulator layer 4. The magnetic head 2a has the same elements as the magnetic head 1a. The shield member 6 has the function of preventing mutual interference between the magnetic head 1a and magnetic head 2a in the write operation or in the read operation and is supportably inserted between the magnetic head 1a and the magnetic head 2a. The magnetic head 1a and the magnetic head 2a may be directly adjoined without utilizing the shield member 6.

The magnetic head 1a and the magnetic head 2a are secured a housing 7, and installed on a actuator (not shown in drawing) driven by a stepping motor (not shown in drawing) and a voice coil motor (not shown in drawing). A read element 10 is comprised of a roughly rectangular magnetic shield 13, auxiliary pole 14, read gap 11 and electromagnetic conversion element 12 formed with a thin film in a submicron thickness. The read gap 11 is formed by the magnetic shield 13 and the auxiliary pole 14 installed in parallel with each other (The auxiliary pole 14 serves as a magnetic shield for the read element 10) and the read gap is the space between the magnetic shield 13 and the auxiliary pole 14. This read gap 11 must be narrowed in order to increase the record density.

The magnetic shield 13 and the auxiliary pole 14 have the function of blocking magnetic flux leaking from a magnetic pattern not directly beneath the electromagnetic conversion element 12. The material of the magnetic shield 13 and the auxiliary pole 14 is shaped of a formable permalloy (NiFe) in a plating process. The electromagnetic conversion element 12 is installed in the center of the read gap 11, in parallel with the magnetic shields 13, 14 by way of the insulator layer 4. A magnetic resistance effect element (MR element) is currently used in many cases in the electromagnetic conversion element 12, however a GMR element having a read sensitivity even higher than the MR element may be used. The electromagnetic conversion element 12 has the function of converting the high density magnetic pattern written on the magnetic tape 5 into electrical signals. Aluminum (Al2O3) is utilized in the insulator layer The write element 20 is comprised of a roughly rectangular main pole 22, a write gap 21, an auxiliary pole 14, and a coil not shown in the drawing. The write gap 21 is formed from a main pole 22 and an auxiliary pole 14 in parallel with each other, and is the space between the main pole 22 and an auxiliary pole 14. The above mentioned coil is formed between the insulator layer 4 between the main pole 22 and auxiliary pole 14. The auxiliary pole 14 also serves as a magnetic shield for the read element 10 and functions for both read and write.

A head having an MR element with the combined functions of an auxiliary pole for record and a magnetic shield for read, is generally referred to as a merge type MR head. The main pole 22 and an auxiliary pole 14 use formable permalloy (NiFe) made in a plating process, as the magnetic material. The material of the above mentioned coil is copper, and the material of the write gap is alumina (Al2O3).

In the magnetic head 1a, the read gap 11 of the read element 10, and the write gap 21 of the write element 20 are installed so their longitudinal directions form a theta θ angle (0°<θ<90°) relative to the drive direction (direction of arrow A) of the magnetic tape 5. This theta θ angle preferably is set to satisfy a relation of 70°<θ<90°. Such a theta θ angle is preferable because when less than 70° the azimuth angle will be too small and the output power of the magnetic head will diminish, the S/N (signal-to-noise) ratio is also generally at a maximum in this range.

In the same way, in the magnetic head 2a, the read gap 11 of the read element 10, and the write gap 21 of the write element 20 are installed to longitudinally face at an angle of 90° relative to the drive direction of the magnetic tape 5. Hereafter, the longitudinal direction of those elements and gaps and the headdrive direction signify the forming of an angle, unless there is some particular description of the angle formed by the element, gaps and head drive direction.

The write operation onto the magnetic tape 5 is explained first. Write operation is performed by making an electrical current flow in the coil of the write element 20. A magnetic field is generated by electrical current flow in the coil from the main pole 22 and auxiliary pole 14 according to the Biot-Savart law (law of magnetism), and a high density magnetic pattern is written on the magnetic layer on the magnetic tape 5 currently being driven.

An example of the high density magnetic pattern is shown in FIG. 2. In this same figure, the odd numbered tracks of track (2n-1) and track (2n+1) are written from right to left by the magnetic head 2a, and the track (2n) and track (2n+2) are written from left to right by the magnetic head 1a. Here, n is a natural number. In this magnetic pattern, the magnetic transition 26 of the even track from the magnetic head 1a, and the magnetic transition 25 of the odd track from the magnetic head 2a form a relative angle (90°−θ). This recording method is called serpentine recording, and reduces the rewind count of the magnetic tape 5, and reduces the write operation time.

The operation for reading information written on the magnetic tape 5 is explained next. Read operation is implemented by making an electrical current flow in the magnetic conversion element 12 of the read element 10. The resistance of the MR element changes according to the intensity and orientation of the magnetic pattern written on the magnetic tape 5 so that by making an electrical current flow, the change in resistance can be detected by ohmic law, as a voltage change.

Here, if I is the current flowing in the MR element, R is the resistance of the MR element, ΔR is the resistance fluctuation rate of the MR element, and α is the angle formed by the electrical current vector and MR element magnetic vector, then the read output voltage VMR of this MR element can be expressed by the following formula.

$$VMR = I \cdot (R + \Delta R \cos 2\alpha) \quad (1)$$

The magnetic shield 13 and auxiliary pole 14 block the leakage of magnetic flux from the magnetic pattern not positioned directly beneath the magnetic conversion element, so that only the magnetic flux from the high density magnetic pattern positioned directly below the magnetic conversion element 12 will be conducted to the magnetic conversion element. A high density magnetic pattern on the magnetic tape 5 can in this way be read with satisfactory accuracy.

When the magnetic head 1a is reading the magnetic pattern of track (2n), the magnetic head 1a must be positioned directly above the track (2n) by actuator drive. However, the accuracy of the mechanical positioning might be deficient due to variations that occur in part dimensions such as in the actuator drive shaft and the step motor during manufacture. An offset (or deviation) in the positioning of the read gap 11 of magnetic head 1a from the track (2n) by an amount equal to angle delta (δ) as shown in FIG. 2 occurs, and the TMR (track miss registration) phenomenon will occur with a certain probability. In such a case, the read output obtained from the magnetic pattern of track (2n+1) generates noise on the read output of track (2n) so the first embodiment functions to extremely reduce the read output of track (2n+1) and limit the generation of noise.

The read gap 11 of magnetic head 1a is parallel to the magnetic transition 26 of track (2n), however, it has a relative angle offset (90°−θ) versus the magnetic transition 25 of track (2n+1), so that an azimuth loss therefore occurs during read out of the magnetic pattern of track (2n+1). The angle offset of the read gap direction and the magnetic transition of the magnetic pattern are generally called the azimuth angle, and azimuth loss is the loss in read output due to this azimuth angle. Therefore, in this embodiment, when β is the azimuth angle, β is found with the following formula.

$$\beta = 90 - \theta \quad (2)$$

Here, when λ is the write wavelength, W is the track width of the magnetic conversion element 12, and L is the azimuth loss, the L is defined by the following formula.

$$L = 20 \log[\sin\{(\pi W/\lambda)\tan \beta\}/(\pi W/\lambda)\tan \beta] \quad (3)$$

Figure 3:
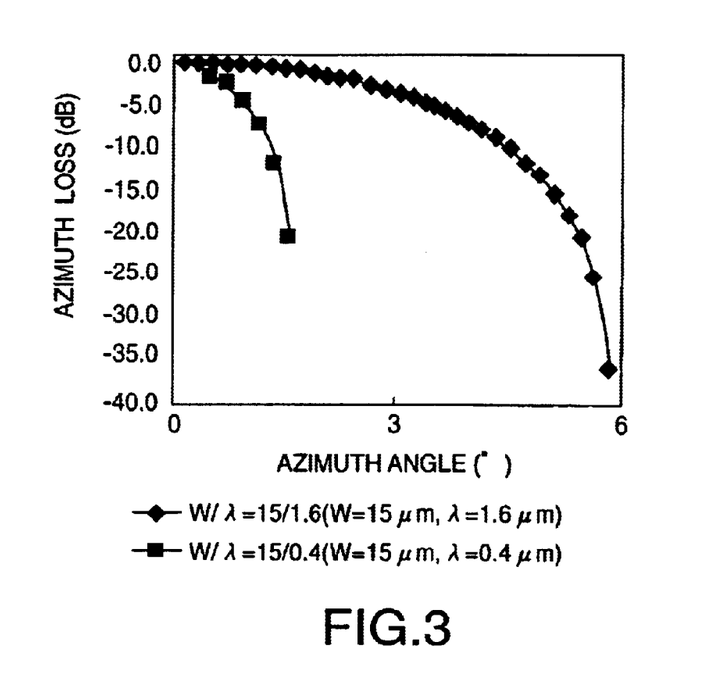
FIG. 3 is a drawing showing the relation of azimuth angle and the azimuth loss in the first embodiment of the magnetic head of this invention.

When the relation of the azimuth angle β to azimuth loss L as shown in FIG. 3, is calculated at a track width W of the magnetic conversion element 12 at 15 μm, and for write wavelengths λ of 1.6 μm (shown by ◆) and 0.4 μm (shown by ■), azimuth loss L exponentially increases (as absolute value) as the azimuth angle β approaches the specified value. Also, the larger the track width W of magnetic conversion element 12, and the smaller the write wavelength λ, the larger significantly the azimuth angle loss L becomes at a smaller azimuth angle β. In this way, when the azimuth angle loss L is large, a large portion of the read output of magnetic head 1 is lost, and the (unwanted) noise from the magnetic pattern of adjacent track (2n+1) is not picked up.

For instance, when the azimuth angle β is 6°, and the write wavelength λ is 1.6 μm as shown in the same figure, the azimuth loss L is −36dB and the loss in read output is approximately 98 percent. Consequently, a drastic cut can be made in the noise caused by the magnetic pattern of track (2n+1) and errors occurring due to mistakenly detecting the noise caused by the track (2n+1) magnetic pattern as a signal from the track (2n) magnetic pattern do not occur.

The read gap 11 of the magnetic head 1a on the other hand, is parallel to the magnetic transition 26 of the magnetic pattern of track (2n) so no azimuth loss L occurs during reading of the track (2n) magnetic pattern, and a high read output can be obtained with no loss.

Thus, even if a TMR (track miss registration) phenomenon from an offset in positioning of the magnetic head 1a versus the specified track occurs due to low mechanical positioning precision caused by variations in the part dimensions of parts such as the actuator drive shaft and stepping motor occurs, the read gap 11 will have an angle offset versus the magnetic transition of the magnetic pattern of the adjacent offset track so that an azimuth loss is applied and the noise caused by the adjacent track will be cut. The magnetic pattern of the specified track can therefore be read with a high S/N (signal-to-noise) ratio, and read errors due to TMR can be prevented. A S/N ratio of 20 dB or more is required at this time, so that an azimuth angle of 1.5° or more is required when W=15 μm, and λ=1.6 μm; and an azimuth angle of approximately 5.4° or more is required when W=15 μm, and λ=0.4 μm.

The operation for reading a magnetic pattern (FIG. 8) written with a head of the related art, by utilizing the head of this invention shown in FIG. 7, is explained next. When reading magnetic patterns with a head having an azimuth angle such as the magnetic head 1a, azimuth loss will occur even if the mechanical positioning is accurate and even if there is no offset in the positioning of the magnetic head 1a on the specified track, and so reading the magnetic pattern of the specified track with a high S/N ratio is not possible. Reading of the magnetic pattern in such cases is therefore performed with the magnetic head 2a. In magnetic head 2a, the read gap 11 of read element 10 and the write gap 21 of the write element 20 are installed at a 90° angle relative to the drive direction of the magnetic tape 5 so no azimuth loss will occur when reading the magnetic pattern (FIG. 8) written with the head of the related art, and the magnetic pattern of the specified track can be read with a high S/N ratio. There will therefore be no problem with writing or reading with the one magnetic head 2a regardless of whether the magnetic tape 5 is driven to the left or to the right.

Figure 4:
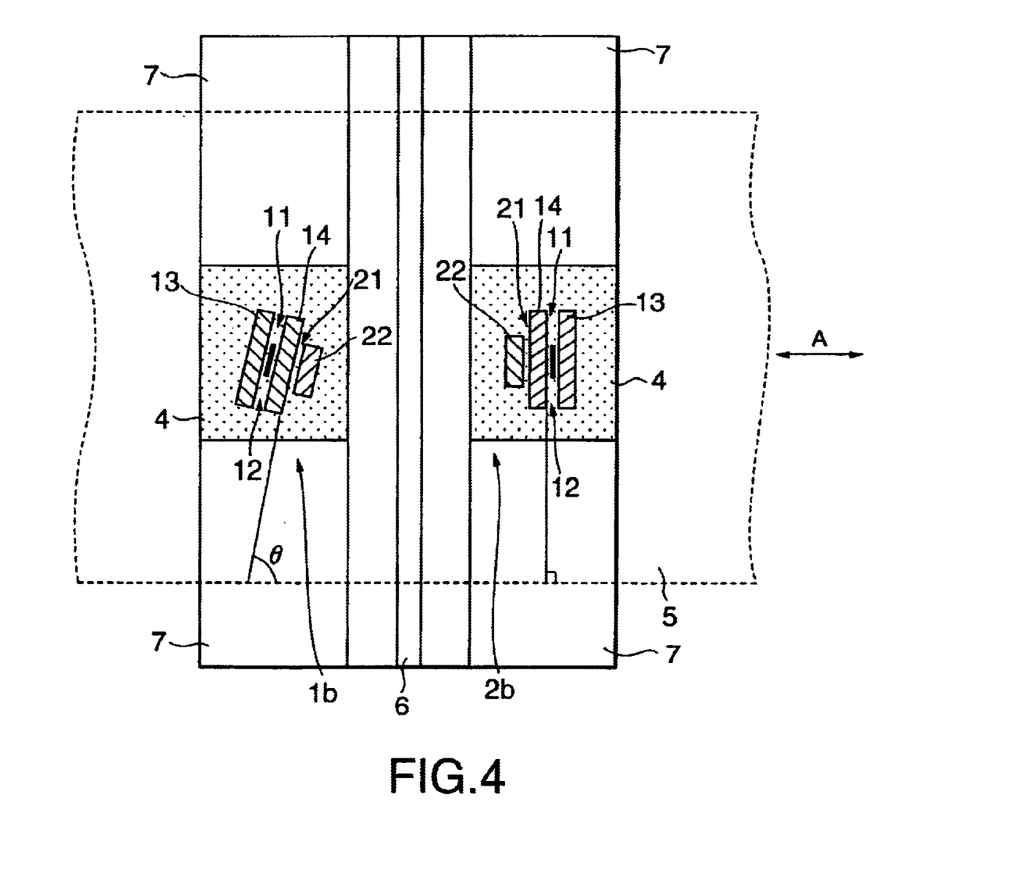
FIG. 4 is a plan view showing the structure of the second embodiment of the magnetic head of this invention.

Another embodiment is explained next while referring to the drawing. First of all, the second embodiment is shown in FIG. 4. This second embodiment has a structure similar to the first embodiment so the parts identical to the first embodiment are assigned the same numbers and an explanation of their operation is therefore omitted here. The point of difference is that the first embodiment has two read elements 10 on the shield member 6 side, or in other words, installed on the inner side of the write element 20 but this second embodiment differs in that the read elements 10 are both installed on the outer side of the write element 20 on the magnetic heads 1b, 2b. In the structure of this second embodiment, the read element 10 and the write element 20 array sequence is only interchanged versus the drive direction (direction of arrow A) of the magnetic tape 5 so that an application and effect identical to the first embodiment can be obtained.

Figure 5:
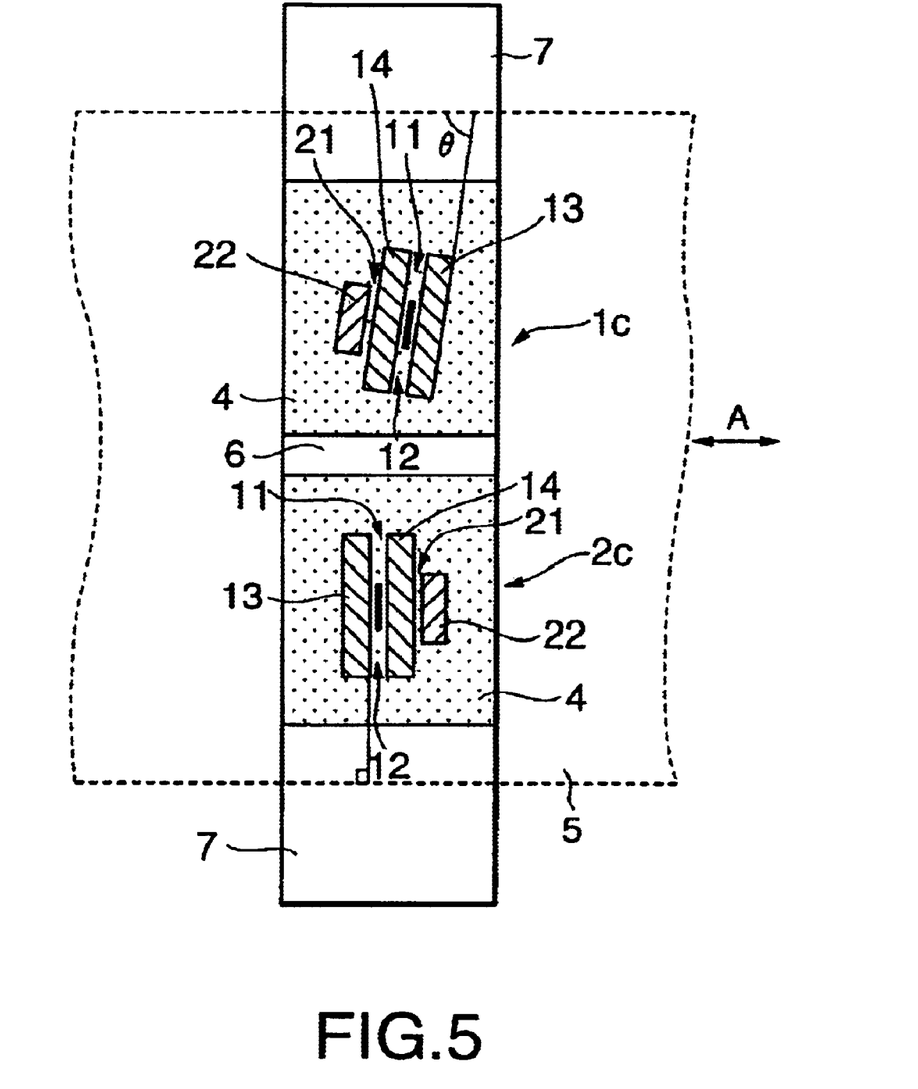
FIG. 5 is a plan view showing the structure of the third embodiment of the magnetic head of this invention.

The third embodiment is explained while referring to FIG. 5. This third embodiment has a structure similar to the first embodiment of FIG. 1 so the parts identical to the first embodiment are assigned the same numbers and an explanation of their operation is therefore omitted here. The point of difference from the first embodiment is that the read gap 11 and the write gap 21 of magnetic head 1c installed so as to form an angle θ (0°<θ<90°) relative to the magnetic tape 5 drive direction (direction of arrow A), and the read gap 11 and write gap 21 of magnetic head 2c installed so as to form a direct angle relative to the drive direction of magnetic head 5 are connected by way of a shield member 6 so as to adjoin each other in parallel in a direction forming a direct angle relative to the magnetic tape 5 drive direction. The two magnetic heads may also be formed to directly adjoin without utilizing a shield member 6.

The structure of this third embodiment also yields an application and effect identical to the first embodiment. Further, the dimensions of the head housing 7 are drawn slightly larger in the vertical direction in order to make the horizontal-vertical dimensions of FIG. 4 easier to view, however the actual vertical dimensions of the housing 7 are much larger than the horizontal dimensions. Therefore, if a structure such as FIG. 5 is utilized, the horizontal dimensions can reduced by approximately one-half without significantly changing the vertical dimensions. In other words, the effect is obtained that the volume of the housing can be drastically reduced.

Figure 6:
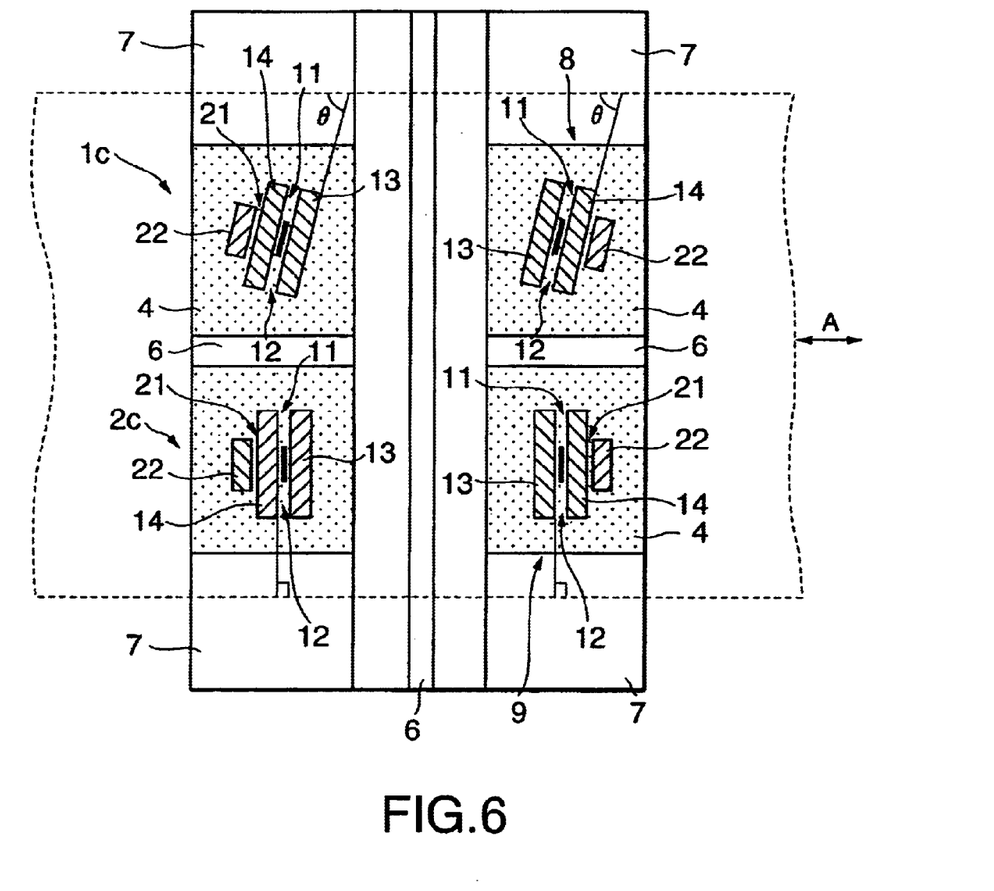
FIG. 6 is a plan view showing the structure of the forth embodiment of the magnetic head of this invention.

The fourth embodiment is shown in FIG. 6. The structural components are the same as the third embodiment of FIG. 5, and the same part members are assigned the same numbers an explanation of the structure and operation of those components is omitted. A point of difference is that the left/right placement of the write element and read element of the magnetic head 2c are reversed compared to the third embodiment of FIG. 5. Also, in a composite thin film magnetic head 8 (magnetic head 8) having a read gap 11 and a write gap 21 forming an angle θ(0°<θ<90°) relative to the magnetic tape 5 drive direction (direction of arrow A), and the placement sequence of each member relative to the drive direction of the magnetic tape 5 installed in the reverse of the magnetic head 1c; and in a composite thin film magnetic head 9 (magnetic head 9) having a read gap 11 and a write gap 21 forming a direct angle relative to the magnetic tape 5 drive direction, and the placement sequence of each member relative to the drive direction of the magnetic tape 5 installed in the reverse of the magnetic head 2c, the magnetic heads 8 and 9 are connected by way of a shield member 6 so as to adjoin the respective magnetic head 1c and magnetic head 2c parallel to the magnetic tape 5 drive direction. The theta θ angle is preferably set to satisfy a relation of 70°<θ<90° in any of the first through fourth embodiments. The left/right placement of the write element and read elements of the magnetic head 2c of FIG. 6 may be made the same placement as FIG. 5.

The magnetic head 8 and the magnetic head 9 are connected by way of the shield member 6 in a direction at a right angle to the drive direction of the magnetic tape 5, the same as for the magnetic heads 1c and 2c. The shield member 6 may be omitted in this embodiment also.

The structure of this fourth embodiment also yields an application and effect identical to the previous embodiments. In addition, in the rare event that the magnetic head 1c of the read element 10, or the write element 20 cease to function, the magnetic head 8 is capable of the handling the functions of the magnetic head 1c and performing operation. Conversely, the reverse is also possible if the magnetic head 8 fails. The magnetic head 2c and the magnetic head 9 can also support each other's functions in the same way. The storage reliability of data written on the magnetic tape 5 can in this way be improved to an even higher level and the marketplace competitiveness of magnetic tape drives further enhanced.

The fifth embodiment utilizes two heads with equivalent azimuth angles relative to the tape drive direction rendering the effect for instance, that data can be read by the magnetic head 8 immediately after being written by the magnetic head 1c, and data can be read by the magnetic head 2c immediately after being written by the magnetic head 9, in a so-called Read-After-Write (Read-While-Write) operation.

In the thin film magnetic head for magnetic tape drive of the invention as described above, even if a (off-track) phenomenon occurs so the magnetic head is not positioned at the correct location due to a TMR (track miss registration) involving deficient mechanical positioning precision, the effect is rendered that the high density magnetic pattern written on the magnetic tape is correctly read without picking noise from the adjacent track.

Another effect of the invention rendered is that the high density magnetic pattern written on the magnetic tape is correctly read with no deterioration in the S/N (signal-to-noise) ratio of the read signal, even if the magnetic pattern (FIG. 8) was written with a head of the related art shown in FIG. 7.

This invention therefore renders the further effect that the reliability of the magnetic tape drive is improved.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A thin film magnetic head for a magnetic tape drive, utilized in magnetic tape drives to read and write computer data and comprising:
   a first composite thin film magnetic head to read and write information on a first track of a magnetic tape, having a read element and write element with a mutual parallel read gap and a write gap; and
   a second composite thin film magnetic head to read and write information on a second track adjacent to a first track having a read element and write element, and a mutual parallel read gap and a write gap,
   wherein the read gap and the write gap of the first composite thin film magnetic head form a right angle relative to the drive direction of the magnetic tape, and the read gap and the write gap of the second composite thin film magnetic head form an oblique angle theta ($\theta$) versus the drive direction of the magnetic tape.

2. A thin film magnetic head for a magnetic tape drive according to claim 1, wherein said oblique angle theta ($\theta$) is greater than 70° and less than 90°.

3. A thin film magnetic head for a magnetic tape drive according to claim 1, wherein said first and second composite thin film magnetic heads are installed in a row intersecting the tape drive direction.

4. A thin film magnetic head for a magnetic tape drive according to claim 2, wherein said first and second composite thin film magnetic heads are installed in a row intersecting the tape drive direction.

5. A thin film magnetic head for a magnetic tape drive, utilized in magnetic tape drives to read and write computer data and comprising:
   a first composite thin film magnetic head to read and write information on a track of a magnetic tape, having a read element and write element with a mutual parallel read gap and a write gap;
   a second composite thin film magnetic head to read and write information on said track, having a read element and write element, and a mutual parallel read gap and a write gap; and
   wherein said first and second composite thin film magnetic heads are arrayed in a row in said tape drive direction, wherein the read gap and the write gap of the first composite thin film magnetic head form a right angle relative to the drive direction of the magnetic tape, and the read gap and the write gap of the second composite thin film magnetic head form an oblique angle theta ($\theta$) versus the drive direction of the magnetic tape.

6. A thin film magnetic head for a magnetic tape drive according to claim 3, wherein said oblique angle theta ($\theta$) is greater than 70° and less than 90°.

7. A thin film magnetic head for a magnetic tape drive according to claim 5, wherein said read elements of said first and second composite thin film magnetic beads are arranged to face one another respectively, in said row in said tape drive direction of said first and second composite thin film magnetic heads.

8. A thin film magnetic head for a magnetic tape drive according to claim 6, wherein said read elements of said first and second composite thin film magnetic heads are arranged to face one another respectively, in said row in said tape drive direction of said first and second composite thin film magnetic heads.

9. A thin film magnetic head for a magnetic tape drive according to claim 5, wherein said write elements of said first and second composite thin film magnetic heads are arranged to face one another, respectively, in said row in said tape drive direction of said first and second composite thin film magnetic heads.

10. A thin film magnetic head for a magnetic tape drive according to claim 6, wherein said write elements of said first and second composite thin film magnetic heads are arranged to face one another, respectively, in said row in said tape drive direction of said first and second composite thin film magnetic heads.

11. A thin film magnetic head for a magnetic tape drive, utilized in magnetic tape drives to read and write computer data and comprising:
   a first composite thin film magnetic head to read and write information on a first track of a magnetic tape, having a read element and write element with a mutual parallel read gap and a write gap; and
   a second composite thin film magnetic head to read and write information on a second track adjacent to a first track having a read element and write element, and mutual parallel read gap and a write gap, wherein said first and second composite thin film magnetic heads are installed in a row intersecting the tape drive direction, and wherein the read gap and the write gap of the first composite thin film magnetic head form a right angle relative to the drive direction of the magnetic tape, and the read gap and the write gap of the second composite thin film magnetic head form an oblique angle theta ($\theta$) versus the drive direction of the magnetic tape, and further comprising: a third composite thin film magnetic head to read and write information on said first track, along with a read element and a write element having a read gap and a write gap in parallel with a read gap and a write gap of said first composite thin film magnetic head; and a fourth composite thin film magnetic head to read and write information on said second track, along with a read element and a write element having a read gap and a write gap in parallel with said read gap and a write gap of said second composite thin film magnetic head.

12. A thin film magnetic head for a magnetic tape drive according to claim 11, wherein said first and third composite thin film magnetic heads are installed in a row in said tape drive direction, said second and fourth composite thin film magnetic heads are installed in a row in said tape drive direction, and said first and second composite thin film magnetic heads are installed in a row intersecting said tape drive direction, and said third and fourth composite thin film magnetic heads are installed in a row intersecting said tape drive direction.

13. A thin film magnetic head for a magnetic tape drive, utilized in magnetic tape drives to read and write computer data and comprising:

a first composite thin film magnetic head to read and write information on a first track of a magnetic tape, having a read element and write element with a mutual parallel read gap and a write gap; and a second composite thin film magnetic head to read and write information on a second track adjacent to a first track having a read element and write element, and mutual parallel read gap and a write gap, wherein the read gap and the write gap of the first composite thin film magnetic head form a right angle relative to the drive direction of the magnetic tape, and the read gap and the write gap of the second composite thin film magnetic head form an oblique angle theta ($\theta$) versus the drive direction of the magnetic tape, and said oblique angle theta ($\theta$) is greater than 70° and less than 90°, and further comprising: a third composite thin film magnetic head to read and write information on said first track, along with a read element and a write element having a read gap and a write gap in parallel with a read gap and a write gap of said first composite thin film magnetic head; and a fourth composite thin film magnetic head to read and write information on said second track, along with a read element and a write element having a read gap and a write gap in parallel with said read gap and a write gap of said second composite thin film magnetic head.

14. A thin film magnetic head for a magnetic tape drive according to claim 13, wherein said first and third composite thin film magnetic heads are installed in a row in said tape drive direction, said second and fourth composite thin film magnetic heads are installed a row in said tape drive direction, and said first and second composite thin film magnetic heads are installed in a row intersecting said tape drive direction, and said third and fourth composite thin film magnetic heads are installed in a row intersecting said tape drive direction.

* * * * *